United States Patent [19]

Johnson

[11] Patent Number: 4,469,804
[45] Date of Patent: Sep. 4, 1984

[54] NIOBIUM OR TANTALUM/HALOGEN-CONTAINING CATALYST REGENERATION PROCESS

[75] Inventor: Thomas H. Johnson, Houston, Tex.

[73] Assignee: Shell Oil Company, Houston, Tex.

[21] Appl. No.: 535,101

[22] Filed: Sep. 23, 1983

[51] Int. Cl.³ .................. B01J 27/32; B01J 27/12; B01J 27/10; B01J 23/20
[52] U.S. Cl. .................................... 502/32; 502/35; 502/36; 502/60; 502/80; 502/224; 502/231; 585/456; 585/462
[58] Field of Search .............................. 502/32, 35, 36

[56] References Cited

U.S. PATENT DOCUMENTS

| | | | |
|---|---|---|---|
| 3,220,959 | 11/1965 | Orzechowski | 502/224 |
| 3,285,890 | 11/1966 | Aftandilian | 502/224 |
| 3,370,101 | 2/1968 | Hayes et al. | 585/462 |
| 3,728,411 | 4/1973 | Siskin et al. | 585/462 |
| 3,852,184 | 12/1974 | Siskin et al. | 502/224 |
| 4,061,689 | 12/1977 | Ryu et al. | 585/456 |
| 4,065,405 | 12/1977 | Hulme | 502/36 |
| 4,083,800 | 4/1978 | Herbstman | 502/35 |

*Primary Examiner*—P. E. Konopka

[57] ABSTRACT

Catalysts containing niobium or tantalum halides which have been deactivated by contact with oxygen are regenerated by being contacted with a halogenated hydrocarbon.

4 Claims, No Drawings

NIOBIUM OR TANTALUM/HALOGEN-CONTAINING CATALYST REGENERATION PROCESS

FIELD OF THE INVENTION

Niobium/halogen- and tantalum/halogen- containing metal oxide catalysts which have been deactivated with contact with oxygen are regenerated by contact with a liquid or gaseous halogenated hydrocarbon.

BACKGROUND OF THE INVENTION

In U.S. application Ser. No. 527,535 filed Aug. 29, 1983 and Ser. No. 527,536 filed Aug. 29, 1983 are disclosed compositions comprising a solid metal oxide substrate having niobium (V) or tantalum (V) halide(s)-/oxide(s) bound to the surface of the substrate. These compositions are used as catalysts in hydrocarbon reactions. When these materials come into contact with oxygen or compounds containing oxygen which is weakly covalently bonded to the compound, they have their activity as catalysts decreased. The instant process provides a method by which these oxygen-deactivated catalysts are regenerated to higher activities.

SUMMARY OF THE INVENTION

The instant invention provides a process whereby catalysts comprising a metal oxide substrate having niobium (V) or tantalum (V) halide(s)/oxide(s) bound to substrate surface and which have been deactivated by contact with oxygen or a compound containing oxygen which is weakly covalently bonded thereto are regenerated to higher activities by contacting said catalysts with a liquid or gaseous halogenated hydrocarbon.

DESCRIPTION OF THE PREFERRED EMBODIMENTS

The catalysts to be regenerated or reactivated by the process of the instant invention comprise pentavalent niobium (also written an niobium (V)) or pentavalent tantalum (also written as tantalum (V)), halogen (or halide), oxygen (or oxide) and a solid metal oxide substrate wherein at least one valence of the niobium or tantalum is bound to oxygen, which oxygen is bound to the substrate, at least one valence of the niobium or tantalum is bound to halogen and the remaining niobium or tantalum valences are bound to halogen and/or oxygen, which oxygen may or may not be bound to the substrate. The halogens are fluorine, chlorine, bromine, iodine and mixtures thereof. Preferred halogens are fluorine and chlorine. These catalyst are described in detail in U.S. patent application Ser. No. 527,535 filed Aug. 29, 1983 and U.S. patent application Ser. No. 527,536, filed Aug. 29, 1983, both incorporated by reference herein. In general, the catalysts are prepared by reacting a substantially anhydrous, hydroxyl-containing metal oxide with niobium or tantalum pentahalide in the vapor state. A preferred method of preparation is to sublime niobium or tantalum pentahalide and react the vapor therefrom with a substantially anhydrous metal oxide. Preferred oxides are aluminum oxide gels, silicon oxide gels and silicon-aluminum oxide gels.

The metal oxides that are useful as substrates to prepare the catalysts are those inorganic oxides which have hydroxyl groups attached to the surface of the substrate. The hydroxyl groups provide the means by which the niobium or tantalum pentahalides are bound by reaction to the surface of the substrate. The scope of the substrate utilized is broad and any metal oxides which have surface hydroxyl (or oxyhydroxyl) groups are utilized in preparing the catalysts.

The term "metal oxide", although used herein in the singular tense, is meant to include the single oxides such as silica, or alumina as well as plural and complex oxides such as silica-alumina, silica-alumina-thoria, zeolites and clays.

The preferred metal oxide substrates used to prepare the catalysts are the porous, solid inorganic oxides which contain surface hydroxyl groups and which are coventionally used as catalysts and catalysts supports. Non-limiting examples of these types of materials include those having a major component of silica or alumina or both, such as, for example alumina and aluminous materials, silica and siliceous materials; clays, particularly open lattice clays; and crystalline aluminosilicates (zeolites). Non-limiting examples of aluminous and siliceous materials include, for example, silica-alumina, silica-magnesia, silica-zirconia, silica-titania, alumina-chromia, alumina-ferric oxide, alumina-titania as well as ternary compositions such as, for example, silica-alumina-titania, silica-alumina-zirconia, etc. Non-limiting examples of crystalline aluminosilicates useful as substrates include synthetic zeolites such as, for example, A, X, Y, L and ZSM types such as ZSM-5and others and naturally occurring zeolites, such as erionite, faujasite, mordenite, sodalite, cancrinite and others. Non-limiting examples of open lattice clays useful as substrates include bentonite, montmorillonite and others. In a preferred embodiment, the metal oxide has a major component of silica or alumina or both.

Particularly suitable as substrates for preparing the catalysts are those solid inorganic oxide compositions known as metal oxide gels or gel oxides. The gel oxides which are particularly suitable for use in preparing the catalysts are any of the metal oxide gels that are well known in the catalytic art useful as either catalyst base materials or as promoting materials in catalyst compositions. Additionally, the term "metal oxide gel" or "gel oxide" as used herein shall also include the plural oxide gels, i.e., those that contain mixtures or compounds of two or more metal oxides. A metal oxide gel is basically a metal oxide that contains chemically bound water in the form of hydroxyl groups or oxyhydroxyl groups as opposed to adsorbed water and water of hydration, although adsorbed water and water of hydration may also be present. They are typically prepared by the precipitation of the metal component(s) in an aqueous medium. Upon calcination at sufficiently elevated temperatures, water is given off and the gel is converted to the oxide with two hydroxyl moieties giving one molecule of water and an oxygen is attached to a metal ion. Illustrative of gel oxide base materials used to prepare the composition of this invention are aluminas, silicas, alumina-silicas, alumina-zirconias, silica-zirconias and the like, including naturally occurring hydrous oxide materials such as clays, such as, for example, the kaolinites, the montmorillonites and the like. Among the clays the open lattice clays are particularly desirable. Also included are the zeolites, both natural and synthetic. The structure of the gel oxides can range from amorphous to highly crystalline. Preferred oxide gel materials are selected from the group consisting of alumina, silica, alumina-silica, crystalline aluminosilicates (zeolites) and open lattice clays. Particularly preferred are silica and alumina.

Since the niobium or tantalum (V) halide/oxide is bound to the surface of the metal oxide substrate by a reaction of niobium or tantalum pentahalide with the metal oxide substrate through a hydroxyl moiety, the metal oxide substrate must have pendant surface hydroxyl groups attached to the surface. Before the reaction to prepare the catalyst, the metal oxide substrate must have pendant surface hydroxyl groups, whereas, after reaction, the metal oxide substrate may or may not have surface hydroxyl groups, depending on the degree of reaction with the niobium or tantalum pentahalide.

Prior to use in preparing the catalysts the hydroxyl-containing metal oxide substrate should be substantially free of adsorbed water, i.e., "substantially dehydrated or anhydrous". The adsorbed or free water is removed by heating the substrate at temperatures ranging from about 100° C. to about 900° C. prior to contact with the tantalum pentahalide vapor. Any environment that provides for drying is suitable such as air, vacuum, inert gas such as nitrogen, etc. The dried metal oxide substrate should be kept away from a humid atmosphere after drying. It is understood that a dried metal oxide substrate prior to use in preparing the catalysts will still contain chemically bound water in the form of hydroxide and oxyhydroxide.

An aluminum oxide gel is one of the preferred substrates. This alumina can be any of the variety of available aluminas. These are commercially available under various names such as alumina gels, activated aluminas, gamma aluminas, etc. Regarding purity of the alumina, it may be stated that small amounts of impurities are not generally detrimental, and may be beneficial when the impurity is present as a cogel. In fact "impurities" may be purposely added for catalytic effects.

Silica gel is also another preferred substrate. These are readily available commercially and are essentially substantially dehydrated amorphous silica. These materials are available in various density grades, from low density with surface areas ranging from about 100–300 $m^2/g$ to regular density with surface areas up to about 800 $m^2/g$. The commercially available materials are used as dessicants, selective absorbents, catalysts and catalyst supports. Regarding purity of the silica, it may be stated that small amounts of impurities are not generally detrimental and may be beneficial when the impurity is present as a co-gel. In fact, "impurities" may be purposely added for catalytic effects.

Other preferred substrates are the aluminosilicates. These materials contain various mixtures of aluminum and silicon oxides. They are readily available commercially and are generally employed as cracking catalysts. Typically they contain from about 50 to about 95, preferably from about 70 to about 90 percent by weight of silica. Illustrations of commercially available alumina-silicas are Davison Grade 980-25 (manufactured by Davison Chemical Division, W. R. Grace & Co.) which contains about 75% $SiO_2$ and 25% $Al_2O_3$ and Davison Grade 980-13 which contains about 87% $SiO_2$ and 13% $Al_2O_3$. These materials can be prepared in a conventional fashion, as for example by co-precipitation, co-gellation, or by spray drying.

Encompassed within the term "aluminosilicates" are most of the zeolites.

The zeolites are found to be specifically useful as substrates. Zeolites are ordered, porous crystalline aluminosilicates having a definite crystalline structure within which there are a large number of small cavities which are interconnected by a number of still smaller channels. Zeolites useful as substrates may be either synthetic or natural. At least 34 species of zeolite minerals are known and the synthetic zeolites number in the hundreds. Any zeolite will be useful as a substrate provided that the zeolite, prior to reaction with niobium or tantalum pentahalide, contains chemically bound water in the form of hydroxyl groups. Depending on the state of reaction, the reacted catalyst product may contain no hydroxyl groups, if all such groups were reacted with the niobium or tantalum pentahalide, or there may be unreacted hydroxyl groups still present.

The techniques for the preparation of the niobium or tantalum pentahalide intermediates are well known in the art and typically are prepared by passing a dry halogen gas over niobium or tantalum metal at elevated temperatures.

The metal oxide-niobium (V) or tantalum (V) halide/oxide catalyst compositions are prepared by a process comprising reacting under substantially anhydrous and oxygen-free conditions a suitable metal oxide which has water chemically bound as hydroxyl and which is substantially free from absorbed water with niobium or tantalum pentahalide vapor and thereafter recovering the product. The metal oxide catalyst compositions thus produced have niobium (V) or tantalum (V) halide/oxide bound to the surface thereof. By the term "bound" it is meant herein that the pentavelent niobium or tantalum has at least one valence bound to an oxygen which is part of the metal oxide substrate. By the term "surface" it is meant both the external and internal pore surfaces which are accessible to the niobium or tantalum pentahalide vapor during the preparative process.

The niobium and tantalum pentahalides readily sublime and thus lend themselves to a preferred method of preparation which is called "reactive sublimation" wherein niobium or tantalum pentahalide is sublimed into an anhydrous, non-oxidizing atmosphere and allowed to contact and react with the hydroxyl-containing metal oxide.

In the preparation of the catalysts, be reactive sublimation, it is important that the reaction be carried out under substantially anhydrous conditions and in a neutral or reducing environment to prevent decomposition of the niobium or tantalum halide.

In this preferred method of catalyst preparation, the niobium or tantalum pentahalide is sublimed by suitable application of temperature and/or vacuum into an essentially anhydrous and oxygen-free atmosphere where it is allowed to contact and react with a substantially anhydrous, hydroxyl-containing metal oxide substrate. Any temperature and/or vacuum which causes the niobium or tantalum pentahalide to sublime is suitable. Temperatures up to about 200° C. are suitable. Frequently the metal oxide substrate is heated during the reaction, say up to about 200° C. This heating is not critical to the preparation of the catalysts, but it has been found that by so heating, a more even distribution of the niobium or tantalum pentahalide on the metal oxide substrate is effected. After reaction, the metal oxide composition is frequently subjected to an additional period of time at sublimation conditions without the presence of a niobium or tantalum pentahalide source. This extra step allows for any unreacted niobium or tantalum pentahalide to be sublimed off of the metal oxide composition. The metal oxide substrate before use in preparing the catalysts is frequently subjected to a heat treatment to remove absorbed water. Vacuum can also be applied. Generally if the pre-treatment temperature is too low, free water will remain, and, if the temperature is too high, sintering of the metal oxide substrate will occur, both of which can adversely affect the catalytic properties of the composition. Generally, the most desirable pre-treatment temperatures of the metal oxide substrate range from about 200° to about 400° C.

The catalysts to be regenerated basically comprise a niobium or tantalum halide bound through an oxygen to a metal oxide substrate. These catalysts are particularly useful for hydrocarbon reactions, such as, for example, alkylation, isomerization, oligomerization and the like. These catalysts are very active. However, contact with feeds containing oxygen or compounds containing oxygen which is weakly covalently bonded to the compound causes the activity of the catalyst to decrease. It is postulated that this loss in activity arises from replacement of halogen by oxygen. Deactivation of the catalysts can occur in several ways, such as by oxygen-containing feed stocks, exposure to air during the catalyst manufacturing, storing or loading process, etc. Deactivation can be caused by oxygen in a gas stream or dissolved in a feed or by an oxygen-containing compound in which oxygen is bonded to the compound by weak covalent bonds. Illustrative, but non-exclusive examples of such compounds are the peroxides and peroxy compounds, both organic and inorganic, and the like.

The basic process for regenerating the niobium or tantalum halide-containing oxide catalysts is to contact the catalysts with a liquid or gaseous halogenated hydrocarbon which is believed to react preferentially with the deactivating oxygen, causing it to be replaced by halogen, thereby improving the activity of the catalyst. Reaction temperatures and pressures for the reaction with the halogenated hydrocarbon are not critical and depend on the particular halogenated hydrocarbon being utilized. These can readily be determined by one skilled in the art. Temperatures of room temperature or greater are generally suitable.

The halogenated hydrocarbons that are suitable for reactivating the niobium or tantalum-containing catalysts are numerous and can not be narrowly specified. They will contain fluorine, bromine, chlorine, iodine or mixtures thereof, with fluorine and/or chlorine being preferred. However, the operative species can readily be determined by routine experimentation. As a first approximation, it can be stated that those halogenated hydrocarbons which at regeneration conditions are thermodynamically favored for converting niobium or tantalum pentoxide to niobium or tantalum pentahalide are suitable as regeneration agents. Thus, the suitability of particular halogenated hydrocarbons can be determined by one skilled in the at from compiled thermodynamic data or from estimations or approximations when such data that is not directly available. One such approximation utilizes heats of formation of reactants and products for the conversion, for example, of $Ta_2O_5$ to $TaCl_5$ with a particular halogenated hydrocarbon. The halogenated hydrocarbons preferably contain 1 to about 4 and most preferably from 1 to about 2 carbon atoms.

Illustrative examples at suitable regenerating agents are, for example, $CCl_4$, $COCl_2$, $CH_3CCl_3$, $SOCl_2$, $C_6H_5CCl_3$ and the various Freons, preferably, such as, for example, Freon 12 ($CF_2Cl_2$), Freon 14 ($CF_4$), Freon 23 ($CHF_3$), Freon 112 ($CCl_2F-CCl_2F$), Freon 116 ($CF_3-CF_3$), Freon 142 (chlor-difluor-methyl methane), Freon C138 (octafluorocyclobutane) and similar materials.

The process of the instant invention is illustrated by the following illustrative embodiments which are provided for illustration and not to be construed as limiting the invention.

ILLUSTRATIVE EMBODIMENTS

Catalyst Preparation

The following illustrates the preparation of a tantalum-containing catalyst. A 200-ml Schlenk flask containing 50–75 g of silica gel (Davison 57, 60–100 mesh) was heated to 300° C. under a vacuum of ca. 0.1 torr for 16–20 h. The flask was moved into a dry box whereupon 6.5 g of the silica was placed on one side of a fritted Schlenk tube. Tantalum chloride (6.0 g) was placed on the other side of the frit. The $TaCl_5$ end of the tube was wrapped with heating tape and then an insulation wrap was installed along with a Thermocouple wire. A vacuum of ca. 0.1 torr was applied at the end of the silica-containing section. The deposition was carried out overnight (16–20 h) at 150° C. with the tube mounted horizontally. The siliceous material was removed in a dry box and then subjected to a vertical sublimation in order to remove any condensed but unreacted $TaC_5$. Catalyst compositions prepared as above contain on the average 12–15% w of tantalum with Cl/Ta atomic ratios of about 2.5/1 to about 3.5/1.

Utilizing a down-flow, fixed-bed reactor which contained about 12 cc of the tantalum-containing catalyst described above, the catalyst was tested for its activity for alkylating benzene with 1-dodecene. At a temperature of 100° C., a pressure of 100 psi, a LHSV of about 0.5 hr$^{-1}$ and then to one mole ratio of benzene to 1-docecene, the conversion of docecene was about 99% with a selectivity to dodecylbenzene of about 98%.

Catalyst Deactivation

The above-described catalyst was deactivated using moist air at 100 psi, 180° C. and a GHSV of 2000 hr$^{-1}$ for 2 hours. A stream of benzene/1-dodecene, 4/1 (v/v), was fed at 180° C., 500 psi and an LHSV at 1 hr$^{-1}$. Analyses of the product stream showed 0% conversion of 1-dodecene and no dodecylbenzene present.

Catalyst Regeneration and Testing

The reactor above was then flushed with $N_2$ at 180° C., 500 psi, and a GHSV of 2000 cc cc$^{-1}$ h$^{-1}$ for 1 hour. The reactor was then fed $CCl_4$ at 400° C., 100 psi, at a WHSV of 3 h$^{-1}$ for one hour. When the reactor was then re-fed with the 4/1 (v/v) benzene/1-dodecene stream used above at 180° C., 500 psi, and LHSV of 1h$^{-1}$, conversion of about 25% of 1-dodecene occurred and phenyldodecane isomers (identified by GC/MS and comparison to authentic samples) were observed. The $CCl_4$ regeneration was re-run with a new catalyst, poisoned and tested as above, under the same conditions above but the regeneration was run for 20 h. Feeding the same benzene/1-dodecene stream as above, this regenerated catalyst now showed 85% conversion of 1-dodecene and dodecylbenzene was the major product (>90% selectivity). The only significant by-product was chlorododecane (mixture of isomers). This by-product decreased with time and was barely observable by GC after 5 hours.

Further Catalyst Regenerations

Twenty-four milliliters of a tantalum (V) chloride-silica composition prepared as described above (containing 13.5% w Ta, 7.6% wt Cl; Davison 57 silica; −20+30 mesh) was deactived by being placed in a 150×75 mm crystalizing dish and being allowed to stand in the open atmosphere overnight. This material was added to a fixed-bed flow reaction whereup on $CF_4$ (Freon 14) was passed through the catalyst at 200° C., 100 psi and a GHSV of 240 $h^{-1}$ for a period of 2 hours. Analysis of the regenerated catalyst by neutron activation indicated that it contained about 15% w Ta, 0.64% w Cl, and 0.14% F. This material now shows a high activity for alkylating benzene with olefins.

In a variation of the process just described about 24 milliliters of the tantalum (V) chloride-silica compositions was added directly to a flow reactor and deactivated by being subjected to an air flow at 200° C., 100 psi at a GSHV of 10,000 $h^{-1}$ for 30 minutes. Then, $CF_4$ (Freon 14) was passed through the bed at 200° C., 100 psi and a GHSV of 240 $h^{-1}$ for a period of 2 hours. Analysis of the regenerated catalyst by neutron activation showed it to contain about 15.7% w Ta, 3.6% w Cl and 0.40% w F. This material now shows a high activity for alkylating benzene with olefins.

In another variation of the just described process, 12 milliliters of the tantalum (V) chloride-silica composition was added to a fixed-bed flow reactor and deactivated by being treated with air at a flow rate of 4 l/min for 15 minutes at 100 psi and 200° C. The airtreated material was then treated with Freon 12 ($CF_2Cl_2$) at 200° C. and 70 psi at a flow rate of 2.4 l/hr for 5 hours. The flow tube was then sealed and left under an atmosphere of Freon 12 at 200° C., 75 psi for 60 hours. Analysis of the regenerated catalyst by neutron activation showed it to contain about 15.7% w Ta, 1.9% w Cl and 5.7% w F. This material now shows a high activity for alkylating benzene with olefins.

I claim:

1. A process for reactivating a catalyst comprising pentavalent niobium or tantalum, halogen, oxygen and an oxide substrate selected from the group consisting of silica, silica-alumina, zeolite, open lattice clays and mixtures thereof wherein at least one valence of the niobium or tantalum is bound to oxygen which is bound to the substrate, at least one valence of the niobium or tantalum is bound to halogen and the remaining niobium or tantalum valences are bound to halogen and/or oxygen which may or may not be bound to the substrate, which catalyst has been deactivated by contact with oxygen or an oxygen-containing compound wherein said oxygen is weakly covalently bound to said compound, which process comprises contacting said catalyst with a liquid or gaseous halogenated hydrocarbon at conditions which are thermodynamically suitable for converting niobium or tantalum pentoxide to niobium or tantalum pentahalide for a time to render said catalysts sufficiently active to catalyze hydrocarbon reactions.

2. The process of claim 1 wherein said halogenated hydrocarbon has a carbon number ranging from 1 to about 4.

3. The process of claim 2 wherein the halogenated hydrocarbon has a carbon number ranging from 1 to about 2.

4. The process of claims 1, 2 or 3 wherein said oxide substrate has a major component of silica, or alumina or a mixture thereof, said halogen is chloride, fluoride or a mixture thereof and said halogeneated hydrocarbon is a chlorinated or fluorinated hydrocarbon.

* * * * *